United States Patent Office 3,429,864
Patented Feb. 25, 1969

3,429,864
ETHYLENE POLYMERIZATION USING CATALYST COMPRISING A MIXTURE OF RARE EARTH COMPOUNDS
Paul R. Stapp, Bartlesville, Okla., assignor to Phillips Petroleum Company, a corporation of Delaware
No Drawing. Filed Dec. 21, 1964, Ser. No. 420,176
U.S. Cl. 260—94.9          13 Claims
Int. Cl. C08f 1/34, 3/06; B01j 11/64

ABSTRACT OF THE DISCLOSURE

Ethylene is polymerized to solid polymer by contacting said ethylene with a catalyst which forms on mixing (a) an organolithium compound and (b) a rare earth metal component, said rare earth metal component containing at least 5 weight percent halogen and at least 0.5 weight percent oxygen. An example of this catalyst system, is the catalyst which forms on mixing n-butyllithium, anhydrous cerium trichloride, and ceric oxide.

---

This invention relates to a new process for the conversion of ethylene to solid polymer.

An object of this invention is to provide a new method for the polymerization of ethylene to solid polymer. A further object is to provide a new catalyst for ethylene polymerization.

Other objects and advantages of my invention will be apparent to one skilled in the art upon reading this disclosure.

Broadly, my invention resides in a process of polymerizing ethylene to solid polymer which comprises contacting ethylene in a hydrocarbon diluent at an elevated temperature and pressure with a catalyst which forms on mixing (a) an organolithium compound of the formula $RLi_x$ where $x$ is an integer from 1 to 4 and R is a hydrocarbon radical selected from the group consisting of aliphatic, cycloaliphatic and aromatic radicals containing not more than 20 carbon atoms and (b) a rare earth metal component selected from the group consisting of (1) rare earth metal oxyhalides and mixtures thereof with at least one compound selected from the group consisting of rare earth metal halides and rare earth metal oxides, and (2) mixtures of at least one rare earth metal oxide and at least one rare earth metal halide, said rare earth metal component containing at least 5 weight percent halogen and at least 0.5 weight percent oxygen, the pressure being over 350 p.s.i. above the vapor pressure of the diluent at the reaction temperature.

The rare earth metals whose compounds are to be employed in the process of this invention are those having atomic numbers ranging from 57–71, inclusive, namely lanthanum, cerium, praseodymium, neodymium, promethium, samarium, europium, gadolinium, terbium, dysprosium, holmium, erbium, thulium, ytterbium, and lutetium.

The halogen present in the halides and oxyhalides is chlorine, bromine or iodine. Examples of these rare earth metal compounds are lanthanum bromide, lanthanum chloride, lanthanum iodide, cerous chloride, cerous iodide, prasedymium bromide, praseodymium chloride, neodymium bromide, neodymium chloride, neodymium iodide, promethium chloride, samarium tribromide, samarium trichloride, samarium dichloride, samarium triiodide, europium chloride, gadolinium bromide, gadolinium chloride, terbium chloride, dysprosium chloride, holmium chloride, erbium chloride, thulium chloride, yetterbium chloride, lutetium chloride, lanthanum oxybromide, lanthanum oxychloride, lanthanum oxyiodide, cerous oxychloride, ceric oxychloride, cerous oxyiodide, praseodymium oxybromide, praseodymium oxychloride, neodymium oxybromide, neodymium oxychloride, neodymium oxyiodide, promethium oxychloride, samarium oxybromide, samarium oxybromide, samarium oxychloride, samarium oxyiodide, europium oxychloride, gadolinium oxybromide, gadolinium oxychloride, terbium oxychloride, dysprosium oxychloride, holmium oxychloride, erbium oxychloride, thulium oxychloride, ytterbium oxychloride and lutetium oxychloride.

Of the rare earth metal halides and oxyhalides and mixtures thereof which can be employed, it is preferred to employ the chlorides and/or oxychlorides of cerium samarium and lanthanum. Cerium compounds are particularly suitable.

Examples of the oxides include lanthanum oxide, cerous oxide, ceric oxide, praseodymium oxide, neodymium oxide, samarium oxide, europium oxide, gadolinium oxide, terbium oxide, dysprosium oxide, erbium oxide, thulium oxide, and ytterbium oxide.

From the previous statement of the invention, it will be apparent that there are a number of possibilities for the rare earth metal component in the catalyst, the important consideration being that the component contain at least 5 weight percent halogen and at least 0.5 weight percent oxygen. The presence of oxygen in the rare earth metal component greatly increases the yield when compared to runs in which no oxygen is present. Thus, oxyhalides can be used alone or in admixture with one or more halides and/or oxides. Further, mixtures of halides and oxides can be used without including an oxyhalide. While suitable rare earth metal components are immediately apparent from the above listings, a few combinations are given as specific embodiments: cerous oxychloride alone; cerous oxychloride with cerous chloride; cerous oxychloride with ceric oxide; cerous oxychloride, cerous chloride, and ceric oxide; a mixture of cerous chloride and ceric oxide; lanthanum oxyiodide; lanthanum oxybromide with ceric oxide; and lanthanum oxychloride, cerous bromide and praseodymium iodide. From these examples, it is apparent that different rare earth metal compounds can be used where a mixture is involved.

Several of rare earth metal halides, such as cerium trichloride, are normally obtained commercially in a hydrated form. Prior to using such materials in the polymerization process, the hydrated form should be dried before contacting the material with the organolithium compound. It is preferred to employ a vacuum technique for drying, but other methods of drying, such as for example, the use of thionyl chloride, can be used.

The organolithium compounds which can be used are represented by the formula $RLi_x$ wherein $x$ is an integer of 1 to 4 and R is a hydrocarbon radical selected from the group consisting of aliphatic, cycloaliphatic, and aromatic radicals containing 1 to 20 carbon atoms. Preferred compounds have the formula RLi, wherein R is an alkyl, aryl, cycloalkyl, alkaryl or aralkyl radical containing not more than 10 carbon atoms. Mixed radicals are suitable. Specific examples of RLi compounds include methyllithium, n-butyllithium, sec-butyllithium, tert-butyllithium, 2-butenyllithium, isooctyllithium, n-decyllithium, phenyllithium, cyclohexyllithium, 2-cyclohexenyllithium, napthillithium, 4-n-butylphenyllithium, benzyllithium, 4-phenylbutyllithium, 4-phenylhexadecyllithium, 1,4-dilithiobutane, 1,6-dilithiohexane, 1,10-dilithiodecane, 1,20-dilithioeicosane, 1,4-dilithio-2-methyl-2-butene, 1,4-dilithio-2-butene, dilithionaphthalene, dilithiomethylnaphthalene, 4,4'-dilithiobiphenyl, dilithioanthracene, 1,1-dilithio-1,1-diphenylethane, 1,2-dilithio-1,2-diphenylethane, 1,2-dilithiotetraphenylethane, 1,2-dilithio-1-phenyl-1-naphthylethane, 1,2-dilithio-1,2-dinaphthylethane, 1,2-dilithiotrinaphthylethane, 1,4-dilithiocyclohexane, 1,3,5-trilithiocyclohexane, 1-lithio-4(2-lithiomethylphenyl)butane, 1,2-di(lithiobutyl)benzene, 1,3-dilithio-4-ethylbenzene, 1,5,12-trilithiododecane, 1,4-di(1,2-dilithio-2-phenylethyl)benzene, 1,5-dilithio-3-pentyne, dilithiophenanthrene, 1,2-dilithiotriphenylethane, dilithiomethane, 1,4-dilithio-1,1,4,4-tetraphenylbutane, 1,4-dilithio-1,4-diphenyl-1,4-dinaphthylbutane, 1,3,5-trilithiopentane, 2,4,6-trilithiooctene-2, 1,4,8-trilithionaphthalene, 4,8,12-trilithioeicosane, 3,5,9-trilithio-8-phenyltetradecane, 2,4,6-trilithio-1-methylcyclooctane, 2,3,4,5-tetralithiooctane, 2,3,4,5-tetralithiononene-1,3,5,7,9-tetralithioeicosane, 2,3,7,8-tertalithio-6-n-decyl-naphthalene, 2,4,6,8-tetralithiocyclododecane, and the like.

The active polymerization catalyst is formed by mixing the rare earth metal component as described above with one or more RLi compounds in the presence of a hydrocarbon diluent. The reaction of these two components goes readily at room temperature, but elevated temperatures can be employed. Heating the catalyst in the absence of ethylene to the polymerization temperature for a few minutes to several hours, prior to introducing the ethylene, frequently effects a substantial increase in polymer yield.

The diluent employed during catalyst preparation can be the same hydrocarbon diluent used in polymerization, but different diluents can be used. Suitable diluents include hydrocarbons such as heptane, hexane, octane, benzene, toluene, xylene, decalin, cyclohexane, cyclooctane, methylcyclohexane, and the like.

The catalyst formed by the reaction of the above-described materials can be formed outside the polymerization vessel and subsequently charged thereto, or the catalyst can be formed directly in the polymerization vessel.

The polymerization process of this invention is carried out at from about 100 to about 250° C. at a pressure of from about 400 p.s.i.g. up to the limit of the equipment. The pressure should be over 350 p.s.i., and preferably at least 600 p.s.i., above the vapor pressure of the diluent at the reaction temperature. Lower pressures lead to liquid 1-olefin products.

The amount of hydrocarbon diluent present in the polymerization zone will generally range from 50 to 500 cc. per liter of polymerization reactor capacity. The amount of diluent present during catalyst preparation will generally range from 10 to 100 volume percent of the amount used in polymerization. The total amount of the rare earth metal component present ranges from 1 to 50 millimoles per liter of reactor capacity. The mol ratio of RLi/rare earth metal component generally ranges from 0.5/1 to 10/1.

The process can be carried out batchwise or continuous, and reaction times can vary from a few minutes to several hours. Inert supports can be used for the rare earth metal compounds, e.g., silica, alumina, silica/alumina, kieselguhr, and the like.

Solid polyethylene of this invention has wide utility as a thermoplastic molding resin. It can be molded to produce film, fiber, etc.

The following example illustrates a specific embodiment of my invention and a control run. It should not be considered unduly limiting.

EXAMPLE

For a control run, 10 millimoles (2.47 grams) of anhydrous cerium trichloride having less than one percent impurity, 30 millimoles of n-butyllithium (19 ml. of 1.6 molar solution of hexane), and 100 milliliters of benzene were stirred together at room temperature for 2 hours and then allowed to stand overnight. The mixture was then charged to a one liter Magnedrive autoclave with the aid of 100 milliliters of additional benzene, pressured to 800 p.s.i.g. with ethylene and heated to 150° C. The reactor was maintained at 150° C. for 4 hours during which time the pressure fell from 1600 p.s.i.g. to 1200 p.s.i.g. (1129 p.s.i. above vapor pressure of diluent). After cooling and venting the reactor, 47 grams of solid polymer were obtained.

In the second run, which was carried out according to the invention, the procedure of the above run was followed exactly except that instead of 10 millimoles of the anhydrous cerium trichloride, 9 millimoles of the same cerium trichloride and 1 millimole of ceric oxide were used. The autoclave was pressured to 700 p.s.i.g. and heated to 150° C. After 2 hours the pressure had dropped from 1350 p.s.i.g. to less than 1200 p.s.i.g, at which time an exothermic reaction occurred, causing the temperature to rise to 187° C. and the pressure to drop to 475 p.s.i.g. (404 p.s.i. above vapor pressure of diluent) in 30 minutes. The reactor was pressured to 800 p.s.i.g. and run on an open ethylene valve at 150° C. for one hour. After cooling and venting the autoclave, 313 grams of solid polymer were recovered. This shows greatly increased conversion in a shorter period of time. For convenience, the results are tabulated.

| Cerium catalyst component | Wt. percent chlorine in cerium component | Wt. percent oxygen in cerium component | Yield polymer, grams |
|---|---|---|---|
| CeCl₃ (pure) | 43 | 0 | 47 |
| CeCl₃+CeO₂ | 40 | 2.6 | 313 |

Many possible variations and modifications of this invention will become apparent to those skilled in the art without departing from the scope and spirit of the invention, and it should be understood that the latter is not necessarily limited to the aforementioned discussion.

That which is claimed is:

1. A process of polymerizing ethylene to solid polymer which comprises contacting ethylene in a hydrocarbon diluent at an elevated temperature and pressure with a catalyst which forms on mixing (a) an organolithium compound of the formula $RLi_x$ where $x$ is an integer from 1 to 4 and R is a hydrocarbon radical selected from the group consisting of aliphatic, cycloaliphatic and aromatic radicals containing not more than 20 carbon atoms and (b) a rare earth metal component selected from the group consisting of (1) rare earth metal oxyhalides and mixtures thereof with at least one compound selected from the group consisting of rare earth metal halides and rare earth metal halides and rare earth metal oxides, and (2) mixtures of at least one rare earth metal oxide and at least one rare earth metal halide, said rare earth metal component containing at least 5 weight percent halogen and at least 0.5 weight percent oxygen, the pressure being over 350 p.s.i. above the vapor pressure of the diluent at the reaction temperature, and the mole ratio of said organolithium compound to rare earth metal component being from 0.5/1 to 10/1.

2. A process of polymerizing ethylene to solid polymer which comprises contacting ethylene in a hydrocarbon diluent at an elevated temperature and pressure with a catalyst which forms on mixing (a) an organolithium compound of the formula RLi wherein R is selected from the group consisting of alkyl, aryl, cycloalkyl, alkaryl, and aralkyl radicals containing up to 10 carbon atoms and (b) a rare earth metal component selected from the group consisting of (1) rare earth metal oxyhalides and mixtures thereof with at least one compound selected from the group consisting of rare earth metal halides and rare earth metal oxides, and (2) mixtures of at least one rare earth metal oxide and at least one rare earth metal halide, said rare earth metal component containing at least 5 weight percent halogen and at least 0.5 weight percent oxygen, the pressure being over 350 p.s.i. above the vapor pressure of the diluent at the reaction temperature, and the mole ratio of said organolithium compound to rare earth metal component being from 0.5/1 to 10/1.

3. The process of claim 2 wherein the pressure is at least 600 p.s.i. above the vapor pressure of the diluent at the reaction temperature and the reaction temperature is 100 to 250° C.

4. The process of polymerizing ethylene to solid polymer which comprises contacting ethylene in a hydrocarbon diluent at an elevated temperature and pressure with a catalyst which forms on mixing (a) an organolithium compound of the formula RLi wherein R is selected from the group consisting of alkyl, aryl, cycloalkyl, alkaryl, and aralkyl radicals containing up to 10 carbon atoms and (b) a mixture of a rare earth metal halide and a rare earth metal oxide, said mixture of rare earth metal compounds containing at least 5 weight percent halogen and at least 0.5 weight percent oxygen, said pressure being over 350 p.s.i. above the vapor pressure of the diluent at the reaction temperature, and the mole ratio of said organolithium compound to said mixture of rare earth metal compounds being from 0.5/1 to 10/1.

5. The process of claim 4 wherein the rare earth metal is cerium.

6. The process of polymerizing ethylene to solid polymer which comprises mixing cerium trichloride, cerium oxide, and butyllithium in the presence of benzene, the mixture of cerium compounds containing at least 5 weight percent chlorine and at least 0.5 weight percent oxygen, and the mole ratio of butyllithium to the mixture of cerium compounds being from 0.5/1 to 10/1, adding ethylene and heating the mixture to at least 150° C. at a pressure over 350 p.s.i. above the vapor pressure of benzene at the reaction temperature, and recovering a solid polymer.

7. A catalyst which forms on mixing (a) an organolithium compound of the formula $RLi_x$ where $x$ is an integral from 1 to 4 and R is a hydrocarbon radical selected from the group consisting of aliphatic, cycloaliphatic, and aromatic radicals containing not more than 20 carbon atoms and (b) a rare earth metal component selected from the group consisting of (1) rare earth metal oxyhalides and mixtures thereof with at least one compound selected from the group consisting of rare earth metal halides and rare earth metal oxides, and (2) mixtures of at least one rare earth metal oxide and at least one rare earth metal halide, said rare earth metal component containing at least 5 weight percent halogen and at least 0.5 weight percent oxygen, and the mole ratio of said organolithium compound to said rare earth metal component being from 0.5/1 to 10/1.

8. A catalyst which forms on mixing (a) an organolithium compound of the formula RLi wherein R is selected from the group consisting of alkyl, aryl, cycloalkyl, alkaryl, and aralkyl radicals containing up to 10 carbon atoms and (b) a rare earth metal component selected from the group consisting of (1) rare earth metal oxyhalides and mixtures thereof with at least one compound selected from the group consisting of rare earth metal halides and rare earth metal oxides, and (2) mixtures of at least one rare earth metal oxide and at least one rare earth metal halide, said rare earth metal component containing at least 5 weight percent halogen and at least 0.5 weight percent oxygen, and the mole ratio of said organolithium compound to said rare earth metal component being from 0.5/1 to 10/1.

9. A catalyst which forms on mixing (a) an organolithium compound of the formula RLi wherein R is selected from the group consisting of alkyl, aryl, cycloalkyl, alaryl and aralkyl radicals containing up to 10 carbon atoms and (b) a mixture of a rare earth metal halide and a rare earth metal oxide mixture of rare earth metal compounds containing at least 5 weight percent halogen and at least 0.5 weight percent oxygen, and the mole ratio of said organolithium compound to said mixture of rare earth metal compounds being from 0.5/1 to 10/1.

10. The catalyst of claim 9 where the rare earth metal is cerium.

11. A process according to claim 6 wherein the mole ratio of butyllithium to cerium components is about 3:1 and the mole ratio of cerium trichloride to ceric oxide is about 9:1.

12. A catalyst according to claim 9 wherein said organolithium compound is n-butyllithium, said rare earth metal halide is cerium trichloride, and said rare earth metal oxide is ceric oxide.

13. A catalyst according to claim 12 wherein the mole ratio of butyllithium to the cerium components is about 3:1 and the mole ratio of cerium trichloride to ceric oxide is about 9:1.

References Cited
UNITED STATES PATENTS

| | | | |
|---|---|---|---|
| 2,920,062 | 1/1960 | McFarland | 260—94.9 |
| 3,112,297 | 11/1963 | Gordon et al. | 260—88.2 |
| 3,166,536 | 1/1965 | Witt | 260—88.2 |
| 3,196,137 | 7/1965 | Gain | 260—93.7 |

FOREIGN PATENTS 840,327  7/1960  Great Britain.

OTHER REFERENCES

Brown et al., J. Poly. Sci. 43, 579, (1960).

JOSEPH L. SCHOFER, *Primary Examiner.*

M. B. KURTZMAN, *Assistant Examiner.*

U.S. Cl. X.R.

260—683.15; 252—429, 430